US006011557A

United States Patent [19]

Keskes et al.

[11] Patent Number: 6,011,557

[45] Date of Patent: Jan. 4, 2000

[54] METHOD FOR OBTAINING A REPRESENTATION OF A GEOLOGICAL STRUCTURE

[75] Inventors: Naamen Keskes, Pau; Philippe Rabiller, Lescar; Shinju Ye, Pau, all of France

[73] Assignee: Elf Aquitaine Production, France

[21] Appl. No.: 08/836,753

[22] PCT Filed: Sep. 11, 1996

[86] PCT No.: PCT/FR96/01397

§ 371 Date: Aug. 4, 1997

§ 102(e) Date: Aug. 4, 1997

[87] PCT Pub. No.: WO97/11393

PCT Pub. Date: Mar. 27, 1997

[30] Foreign Application Priority Data

Sep. 19, 1995 [FR] France ................................ 95 10963

[51] Int. Cl.[7] ................................ G06T 7/40

[52] U.S. Cl. ................................ 345/430; 345/426; 702/13; 382/156; 73/152.02

[58] Field of Search ................................ 345/430, 426; 702/13; 382/156; 73/152.02

[56] References Cited

U.S. PATENT DOCUMENTS

| | | | |
|---|---|---|---|
| 4,821,212 | 4/1989 | Heartz | 345/426 |
| 4,916,616 | 4/1990 | Freedman et al. | 702/13 |
| 5,473,747 | 12/1995 | Colin et al. | 395/161 |
| 5,689,581 | 11/1997 | Nakao et al. | 382/156 |
| 5,748,867 | 5/1998 | Cosman et al. | 345/430 |

FOREIGN PATENT DOCUMENTS 2571512 4/1986 France .

OTHER PUBLICATIONS

The Leading Edge, Jun. 1994, USA, pp. 674–678, XP002007163.

Ronen Eta LA.: "Seismic–guided estimation of log properties".

IGARSS '95 Quantitative Remote Sensing for Science and Applications, vol. 1, Jul. 10–14, 1995, Firenze, Italia, pp. 135–137, XP000547088.

Zhen Zhang: A hybrid system for seismic section segmentation controlled by an quadtree construction algorithm.

*Primary Examiner*—Mark R. Powell
*Assistant Examiner*—Kimbinh T. Nguyen

[57] ABSTRACT

A method for obtaining a representation of the textures of a geological structure, characterized in that images characteristic of the sedimentology of the environment are formed, parameters corresponding to the nature of the images are estimated at every point of each image and in a spatial domain around the point so as to determine a texture vector for each of the points and to obtain a set of texture vectors. The method also includes the steps of selecting texture vectors representative of the characteristic textures of the geological environment in the set of texture vectors; and using a neural network formed of cells distributed in two dimensions which contains as many cells as characteristic textures. The selected texture vectors are used to submit the neural network to a learning process so that a final topology map of the textures characteristic of the geological environment is obtained.

13 Claims, 2 Drawing Sheets

2D TOPOLOGICAL MAP OF CHARACTERISTIC TEXTURES.

2D TOPOLOGICAL MAP OF CHARACTERISTIC TEXTURES.

FIG_1

METHOD FOR OBTAINING A REPRESENTATION OF A GEOLOGICAL STRUCTURE

BACKGROUND OF THE INVENTION

The present invention relates to a method for producing the textures characterizing a geological structure on a support and, more particularly, a method for obtaining a representative topological map of the textures characterizing a geological structure from an image of an area of said geological structure.

Electrical images of well boreholes as obtained, for example, via FMI (Fullbore Formation MicroImage) and/or FMS (Formation Micro Scanner) tools which are developed by the Schlumberger Company, are of interest to the petroleum industry for the wealth of information which they contain. These images are used nearly exclusively by structuralists for the fine measurement of the geometric characteristics of the bedding and fracture planes in boreholes.

The FMS and FMI tools serve to acquire electrical images from measurements of the local electrical conductivity of the well borehole and utilize four articulated arms, each equipped with a pad and a flap (accompanied pad). Each pad comprises 24 electrodes, for example, and is held against the well borehole by a mechanical system, throughout the image acquisition time.

An electrical image is a view of the well borehole and, when the borehole is open, presents a horizontal axis representing the azimuthal distribution of the pad electrodes, and a vertical axis corresponding to the depth (elevation) of the tool in the borehole. The image of the well borehole is thus formed, for example, of 24 columns (one column per electrode) and several thousand lines, each pixel of the image having a size of about 2.5 $mM^2$. The electrical image is analyzed in terms of planar heterogeneities and point heterogeneities. The planar heterogeneity is used to analyze the bedding planes and the fracture planes of the geological medium which are intersected by the stratification. The rest of the electrical image represents the variations which are associated with variations in the petrophysical parameters (porosity) or with variations in sedimnentological parameters (bioturbations etc).

The analysis and automatic segmentation of the texture of the electrical images of the well borehole have been undertaken. However, the operations performed for the above purpose raise problems from the standpoint of discrimination. Discrimination is the process of identifying typical textures observable in the electrical image of the borehole, making a scan of the attributes to characterize them, and finally, in the attribute space, determining hyperplanes to discriminate them.

J. F. Rivest proposes to use a mathematical morphology and a hierarchical classification ('Analyse automatique d'images géologiques et l'application de la morphologie mathématique aux images diagraphies', PhD Thesis, Ecole Nationale Supérieure des Mines de Paris, 1992).

Harris et al use co occurrence matrices with a classification by neural networks for discrimination ('The identification of lithofacies types in geological imagery using neural networks', Eurocaipep 93, 20-22/09/1993), whereas, by using the texture energies defined by Laws (Goal, Directed Texture Segmentation, Technical Note 334, Artificial Intelligence Center, SRI International, Meulo Park, 29 p.), Luthi proposes an analysis by principal components to compress said energies ('Textural segmentation of digital rock images into bedding units using texture energy and cluster, Mathematical Geology, Vol. 26, No. 2, pp. 181–198).

Gagalowicz tried to explain that a texture is a quantitative measurement for describing the content of a region in an image and that it is related to visual perception. He translated this via the 'invariance by translation' concept, i.e., the observation of a texture leaves the same visual impression irrespective of the portion of the texture observed. He also defined the 'textural resolution', which is the minimum size of the observation window under which the textural parameters are no longer invariant by translation. ('Vers un modéle de textures', PhD Thesis, Université de Paris VI, 1983).

Gagalowicz and Ma ('Natural texture synthesis with the control of correlation and histogram', 3rd Scandinavian Conference on Image Analysis, Copenhagen, Denmark, July 1983) proposed a model which is defined by the moments of the first and second orders (histogram and autocovariance) and demonstrated that this model can be used to represent a vast class of natural textures. In fact, the histogram helps to preserve the textural contrast, while the autocovariance provides the data on the orientation and size of the texture grains.

The histogram (H) and autocovariance ($M_2$) are given by equations (1) and (2):

$$H(l) = \frac{1}{N}\sum_{i}^{N}\delta(X_i - l) \quad (1)$$

$$M_2(\Delta) = \frac{1}{N}\sum_{i}^{N}\frac{(X_i - \eta)(X_{i+\Delta} - \eta)}{\sigma^2} \quad (2)$$

where:

$$\eta = \frac{1}{N}\sum_{i}^{N} X_i \quad \text{(mean)}$$

$$\sigma^2 = \frac{1}{N}\sum_{i}^{N}(X_i - \eta) \quad \text{(variance)}$$

$\Delta=(\Delta x,\Delta y)$ is a translation of the plane;

N is the total number of image pixels;

$X_i$ and $X_i+\Delta$ are the values of the luminous intensity of the pixels in position i and i+Δ of the texture;

l is one of the L possible luminances; and

δ is the Kronecker indicia, δ(x)=1, if x=0 and δ(x)=0 everywhere else.

Since $M_2(\Delta)=M_2(-\Delta)$, the total number of translations to observe the texture is:

$$M=Nx*Ny/2-1, \quad (3)$$

where Nx and Ny are the sizes of the control texture in X/Y coordinates, which are adjusted according to the structure and the texture concerned.

The number of parameters of the texture model defmed by the histogram H and the autocovariances $M_2(\Delta)$ is hence:

$$D_2=L+M \quad (4)$$

However, this model has a relatively small number of parameters compared with the other stochastic models such as those of the cooccurrence matrices, and does not always help to describe the set of textures visible on the electrical images.

SUMMARY OF THE INVENTION

An object of the present invention is to present a method which consists of a stochastic approach, strict and fully automated, for textural analysis and segmentation, from electrical images of the well borehole.

The present invention relates to a method for producing a topological map of textures associated with a geological medium, characterized in that:

images are produced characterizing the sedimentology of said medium;

at every point of each image, and in a spatial domain about said point, parameters corresponding to the nature of said images are estimated in order to determine the texture vector for each of said points in such a way as to obtain a set of texture vectors;

from said set, texture vectors are selected which are representative of the characteristic textures of said geological medium;

a neural network is used formed of cells distributed in two dimensions which comprises as many cells as characteristic textures, and a learning process is applied to said neural network via said selected texture vectors, in order to obtain a final topological map of said characteristic textures of the geological medium.

The present invention is applicable in particular to electrical images of borehole walls using the tools described previously.

It is also applicable to the images obtained from photographs of core layouts sampled in the geological environment, one particular photographic tool having been developed by the applicant under the name AUTOCAR and described in Reference FR-A-2 571 512.

According to other features of the invention, the points of an area are disposed on the same vertical axis and are identified by their elevation, for each elevation, the corresponding cell in the topological map is determined and the number of the cell is assigned to the elevation, where the representation of the correspondences between elevations and cells constitutes a texture log. The texture log can be used to produce a distance log, which represents the distance between two consecutive textures.

In this way, a texture log is generated, which is novel in itself. The texture log corresponds to the quantitative change in the texture of the geological formation as a function of depth. Furthermore, the a texture log, under certain conditions, allows the prediction of the depositional environment and the permeability of the geological formation.

BRIEF DESCRIPTION OF THE DRAWINGS

The above and other features and advantages will appear from a reading of the description of an embodiment of the method of the invention, and the appended drawings wherein.

DETAILED DESCRIPTION OF THE INVENTION

In a drilling well, a four-pad tool of the type described above is inserted and an electrical image of at least one area of the well wall is produced. This method is well known to specialists, and is therefore not described here in detail. Each pad generates an electrical image in the form of a vertical band. The four images $I_1$ to $I_4$ for a given area of the well are schematically represented in the left-hand part of FIG. 2. These images are structural and sedimentary images which characterize the sedimentology of the geological medium.

Figure 2:
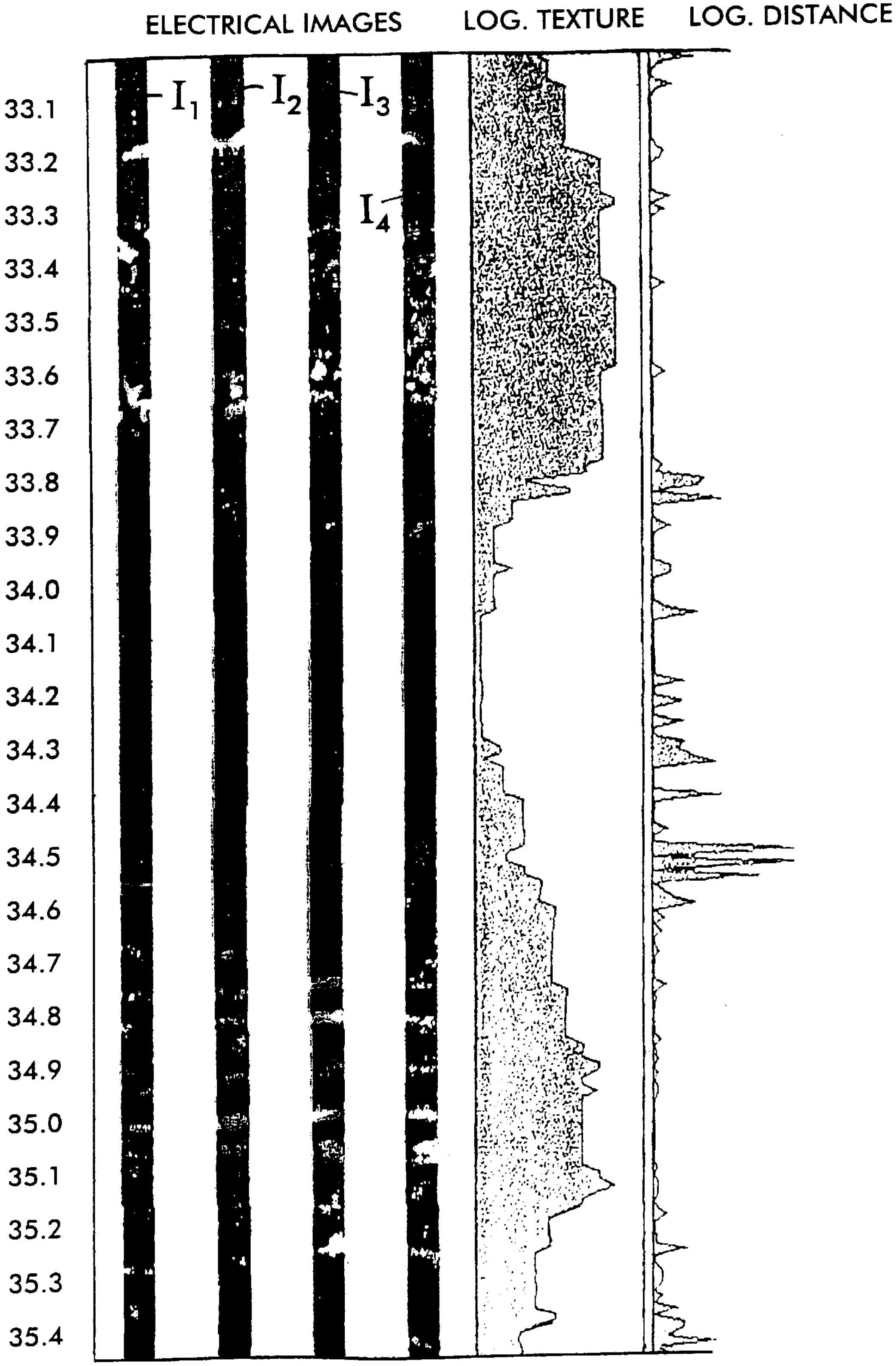
FIG. 2 is a texture log obtained by the method of the invention and from the topological map in FIG. 1.

The present invention proposes to identify a characteristic texture for each depth or elevation of the well, for example, between elevations 33.1 and 35.4, as indicated in FIG. 2. The texture vector B, at a depth or elevation d, is defined by the mean of the texture vectors calculated, for example, in a 15×15 cm control window along the sinusoid of the bedding plane. The sinusoid corresponding to a bedding plane is the representation in the electrical image of the intersection of the well wall, considered to be cylindrical, by the bedding plane, which is generally a plane that is non-perpendicular to the well axis. The phase and amplitude of the sinusoid indicate the azimuth and apparent dip respectively. Knowing the deviation of the well, the phrase and amplitude also serve to determine the true or real azimuth and inclination. To maximize the stability of the texture vector B, the orientation of the control window is adjusted to the local dip of the sinusoid.

According to the invention, parameters corresponding to the nature of the image are estimated at every point of the electrical image concerned and also in a spatial domain about the point. These parameters are related to the texture, and are used to obtain a texture vector associated with the point.

It is possible, to describe the set of textures visible on the electrical images $I_1$ to $I_4$ of the well wall by quantifying the grey levels into eight levels and by using a 15×15 cm control window, which provides.

$$8+\frac{15\times 15-1}{2}=120$$

texture parameters.

It is preferable to validate the model by using the texture vector B to synthesize a texture that is visually comparable to the original texture of the image. The synthesis method used is similar to the one developed by Ma ('Modélisation et synthése de textures, Application á l'infographie', PhD Thesis, Université de Paris VI, 1983), and whose originality consists in generating an image whose attribute vector is $B^{TX}$, by minimizing the mean square error ERR:

$$ERR=\|B-B^{TX}\|_2$$

The synthesis is performed in two operations and is described briefly below.

Initiully, a white noise image is generated, having a histogram which is equal to that of the original texture. To do this, a random number Am is generated between 1 and N (total number of image pixels) in a uniform distribution. A value X is found at point $m(X_m)$ using the cumulative histogram function. Since all the points of the white noise image are independent, the autocovariances $M_2{}^{TX}(\Delta)$ are all zero.

Next, the texture generated is modified, point by point, by minimizing ERR. This is done by replacing the luminance $l_i$ at point i by $l_{opt}$ such that:

$$ERR_{opt}=\underset{k\in L}{\mathrm{Min}}\|B-B_K^{TX}\|^2$$

If the luminance $l_i$ of point i is replaced by $l_k$ ($l_k \in L$), the statistical texture parameters TX are modified as follows:

$$H^{TX}(l_i)\rightarrow H^{TX}(l_i)-1/N$$

-continued $$H^{TX}(l_k) \rightarrow H^{TX}(l_k) + 1/N$$

$$\forall\, \Delta,\, \Delta \in T\Delta,\; M_2^{TX}(\Delta) \rightarrow M_2^{TX}(\Delta) + \frac{(l_j + l_j' - 2\eta)(l_k - l_i)}{N\sigma^2}$$

where $l_j$ and $l_j'$ are the luminances of points i+Δ and i+Δ respectively.

Hence:

$$ERR = \|B - B^{TX}\|^2 = W\sum_{l\in L}(H(l) - H^{TX}(l))^2 + \sum_{\Delta\in T\Delta}(M_2(\Delta) - M_2^{TX}(\Delta))^2$$

where the coefficient W is a constant number determined experimentally (W=2000) and enables the parameters of different types (histogram and autocovariance) to converge uniformly. The image points are selected along a random scan path in order to ensure the most uniform possible error distribution.

It may be observed that the algorithm is such that the mean square error ERR is a monotonic decreasing function. This ensures that the ERR converges toward a local minimum. The ERR is found to converge for all the textures of the electrical images up to a few percent of its initial value, with only two to five iterations. An iteration is a complete scan of the image.

The iterations are continued, as required, until the visual resemblance between the original texture and the synthetic texture is the best possible.

When all the texture vectors have been validated by the synthesis method described briefly above, a set of vectors is obtained which are either different from each other or similar to each other.

Texture vectors, characteristic of the geological environment, are then selected from the set of validated texture vectors.

According to the present invention, a topological map is used both to classify and order the texture vectors. Thus, if the texture vectors are classified and ordered correctly, the visually similar textures are found in the topological map in neighboring classes.

According to the present invention achieve these two objectives of classification and order, a two dimensional unsupervised neural network is constructed, particularly of the Kohonen type, which comprises as many cells as there are characteristic textures.

Next, the neural network undergoes a learning process via selected texture vectors so that, at the end of the learning process, each cell corresponds to a texture vector to be recognized.

To do this, iterations are carried out as follows.

Let E be the set of texture vectors to be classified, and C be the set of cells of the topological map:

iteration 0: the weights of the cells of the topological map are randomly initialized, iteration t ($1<t\leqq$maximal iteration): updating the weights of the map is broken down into two steps:

(1) for each texture vector $E_i$ of the set E, the cell $C_i$ closest to $E_i$ is located in the topological map, (2) the weights of the cells $C_j$ belonging to the neighborhood of cell $C_i$ cure updated.

$$Cj(t)=Cj(t-1)+f(\epsilon(t),d,\sigma(t))*(Ei(t)-Cj(t-1))$$

where:

d is the distance between cell $C_i$ and cell $C_j$,

σ(t) is the neighbor parameter, and

ϵ(t) is the gain factor.

According to a feature of the invention, ϵ(t) is lower than 1 and preferably equal to about 0.7 at the first iteration, and ϵ(t) and σ(t) decrease after each presentation cycle of the texture or iteration vectors. The iterations are considered complete when the desired convergence has been achieved, i.e. when a new presentation of the selected texture vectors does not modify or only very slightly modifies the order of the cells.

Figure 1:
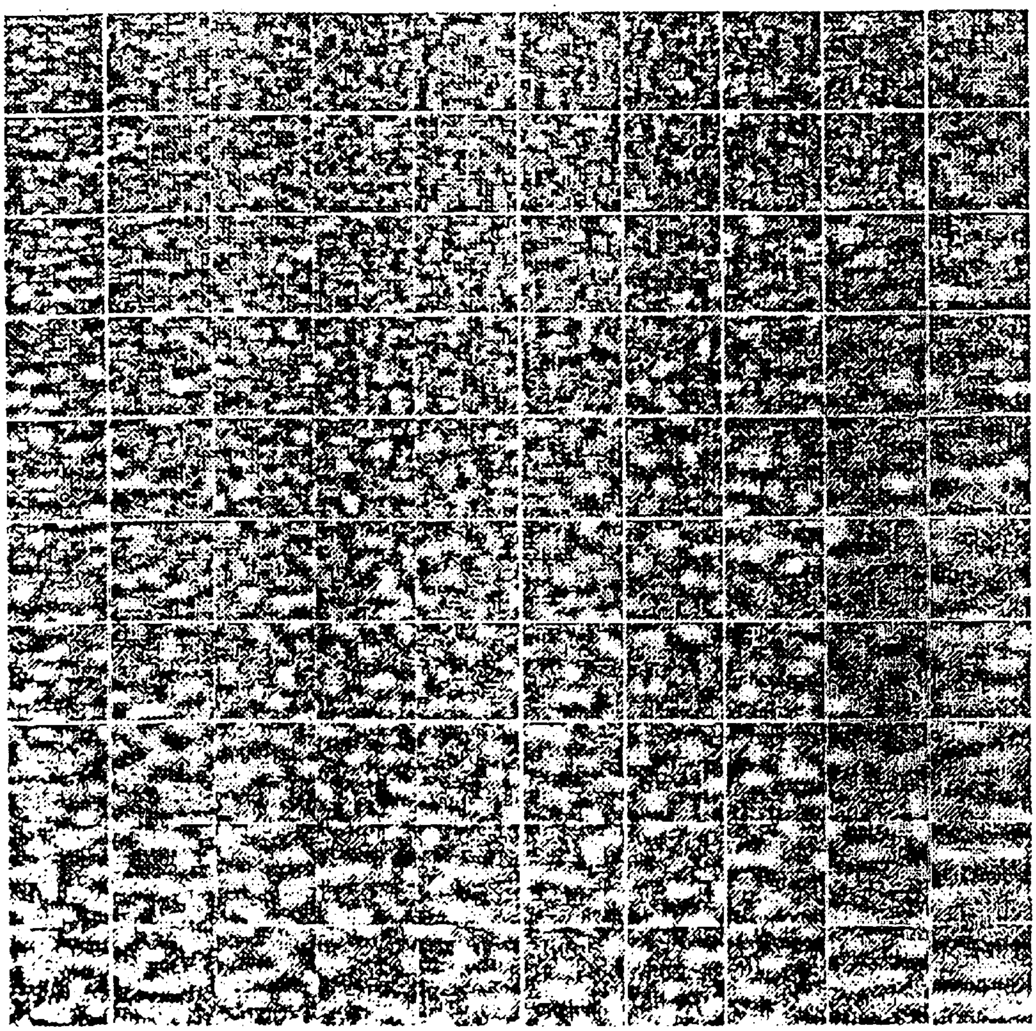
FIG. 1 represents a topological map of characteristic textures of a geological medium.

FIG. 1 represents the map of textures obtained by the method of the invention, where each cell of the one hundred cells represented corresponds to a characteristic texture of the geological zone of the well concerned. Thus, there are as many cells as classes of characteristic textures to be classified and ordered.

In the map of characteristic textures in FIG. 1, the cells are numbered in a zig-zag fashion in increasing order starting with the upper right-hand cell, so that a running number is assigned to each cell.

According to another feature of the present invention, it is possible to prepare a novel texture log, of an acoustic or electric log, which corresponds to the quantitative change in the texture of the geological formation as a function of depth, in (FIG. 2, central portion).

To generate a texture log according to the present invention, all the texture vectors of the images are compared with the topological map, each texture vector is associated with an elevation of the well.

Each texture vector compared with the topological map is assigned the number of the cell which corresponds to it, i.e., the cell whose texture most closely resembles the texture defined by the texture vector presented.

The correspondence between elevations and cells on any support gives the texture log.

It is therefore clear that, according to the present invention, planar textures and point textures of different contrasts and grain size distributions can be recognized directly using the topological map in FIG. 1 and/or the texture log derived from it. In fact, the image of a texture consists of areas whose size and shape serve to distinguish the planar textures (elongated shapes and rather large sizes) from the point textures (round shapes and small to medium sizes).

Using the texture log, a distance log can be defined (right-hand portion of FIG. 2) which represents the distance between consecutive textures, i.e., the distance between the corresponding texture vectors. For a given elevation, each texture vector is determined by the parameters defined by the histogram and the autocovariance.

The present invention is neither limited to the electrical images obtained with tools whose characteristics have been given above, to core images, nor to the mapping of the textures of a well.

In fact, the images can be obtained from other sources. The key factor is to be able to determine, texture vectors which will subsequently be classified and ordered from said images according to the method of the invention.

Thus, it is possible to conduct the learning process of the neural network, and particularly, of a two-dimensional Kohonen topological map, with texture vectors obtained from different wells of the same field of wells, or even from a geological basin comprising the field of wells. In this way, a topological map, which may, for example, comprise hundreds of cells or classes, or even more, is representative of the field of wells and/or of the geological basin. To do this, one can take a first well, texture vectors of a second well and a third well etc, in the same field, with which the learning of the two-dimensional neural network is achieved. When the convergence of the topological map extracted from the neural network is obtained, all the wall texture vectors of the first well may be used to produce a first texture log for this first well. And the wall texture vectors of the second well are used to produce a second texture log for the second well, and so on for each of the other wells of the field. Alternatively all the texture vectors of all the wells may be used in order to generate a texture log which is representative of all the textures of all the walls of the wells concerned. Such a texture log and the resulting texture log will obviously be representative of the field of wells.

At the scale of a geological basin, the texture vectors of the field of wells can be used and combined with texture vectors produced by other means, particularly from sedimentary cores sampled in a number of locations of the basin. It is clean that the analysis and interpretation of the texture logs is the wor of sedimentologists who will have to determine the nature of the sediments and other rocks associated with the topological map or maps and/or with the testure logs obtained according to the invention. It is conceivable that such a general approach can be extended to other areas that are larger than the basin, since sedimentologists agree that there is a finite number of textures and that the learning of the topological map could be achieved with texture vectors representative of the various textures likely to exist, in order to obatin a final topological map, obviously in the appropriate dimensions, which is in fact usable for any type of texture which is presented to it.

What is claimed is:

1. A method for obtaining a topological map of textures of a geological medium, comprising she steps of:

producing images characterizing the sedimentology of said medium;

estimating parameters corresponding to said images at every point and in a spatial domain about said point of each image, in order to determine a texture vector for each of said points and obtain a set of texture vectors comprised of all determined texture vectors;

selecting texture vectors from said set which are representative of characteristic textures of said geological medium;

using a neural network which is formed of cells distributed in two dimensions and which comprises as many cells as characteristic textures, and applying a learning process to said neural network via said selected texture vectors in order to obtain a final topological map of said characteristic textures of the geological medium.

2. The method of claim 1, characterized in that the images are electrical images of a wall layout for a well drilled in said medium.

3. The method of claim 1, characterized in that the images are obtained from layouts of cores sampled in said geological medium.

4. The method of claim 1, characterized in that all the texture vectors of the set are presented to the neural network after the learning steps; that the points of the images corresponding to an area of said geological medium are disposed on a common vertical axis and identified by their elevation; and that, for each elevation, a corresponding cell is determined in the topological map and the number of said cell is assigned to it, the representation of the correspondence between elevations and cells constituting a texture log.

5. The method of claim 4, characterized in that, from the texture log, a distance log is generated which represents the distance between the consecutive textures.

6. The method of claim 2, characterized in that the electrical images are obtained from a plurality of wells drilled with a spacing between them.

7. The method of claim 1, characterized in that the final topological map is representative of at least the portion of the geological medium comprising said drilled wells.

8. The method of claim 1 characterized in that the neural network is unsupervised.

9. The method of claim 2, characterized in that all the texture vectors of the set are presented to the neural network after learning, further in that the points of the images corresponding to an area of said geological medium are disposed on the same vertical and identified by their elevation, and further in that, for each elevation, the corresponding cell is determined in the topological map and the No. of said cell is assigned to it, the representation of the correspondence between elevations and cells constituting a texture log.

10. The method of claim 3, characterized in that all the texture vectors of the set are presented to the neural network after learning, further in that the points of the images corresponding to an area of said geological medium are disposed on the same vertical and identified by their elevation, and further in that, for each elevation, the corresponding cell is determined in the topological map and the No. of said cell is assigned to it, the representation of the correspondence between elevations and cells constituting a texture log.

11. The method of claim 9, characterized in that, from the texture log, a distance log is generated which represents the distance between the consecutive textures.

12. The method of claim 10, characterized in that, from the texture log, a distance log is generated which represents the distance between the consecutive textures.

13. The method of claim 6, characterized in that the final topological map is representative of at least the portion of the geological medium comprising said drilled wells.

* * * * *